United States Patent
Kloos

(10) Patent No.: US 8,801,249 B2
(45) Date of Patent: Aug. 12, 2014

(54) TRANSFORMATION OPTICS ASSEMBLY

(71) Applicant: HELLA KGaA, Lippstadt (DE)

(72) Inventor: Gerhard Kloos, Erwitte (DE)

(73) Assignee: HELLA KGaA, Lippstadt (DE)

( * ) Notice: Subject to any disclaimer, the term of this patent is extended or adjusted under 35 U.S.C. 154(b) by 0 days.

(21) Appl. No.: 13/646,255

(22) Filed: Oct. 5, 2012

(65) Prior Publication Data

US 2013/0208493 A1 Aug. 15, 2013

(30) Foreign Application Priority Data

Oct. 6, 2011 (DE) .......................... 10 2011 054 233

(51) Int. Cl.
F21V 5/00 (2006.01)

(52) U.S. Cl.
USPC ........... 362/521; 362/235; 362/244; 362/331; 362/520; 362/543

(58) Field of Classification Search
USPC ........... 362/227, 235, 244, 311.01, 326, 509, 362/520, 521, 543
See application file for complete search history.

(56) References Cited

U.S. PATENT DOCUMENTS

2013/0155712 A1* 6/2013 Kloos .......................... 362/521

\* cited by examiner

Primary Examiner — Diane Lee
Assistant Examiner — Meghan Dunwiddie
(74) Attorney, Agent, or Firm — Husch Blackwell LLP; H. Frederick Rusche; Daniel S. Cohn

(57) ABSTRACT

A transformation optic arrangement for vehicles to convert a planar light distribution into an angular light distribution with a plurality of light sources arranged in one level like a matrix to generate the planar light distribution and with an optic unit arranged in front of the light sources in a primary direction of emission to deflect the light, with the optic unit comprising at least one first lens, with at least one additional lens being provided between the first lens and the light sources, arranged coaxially in reference to the z-axis extending in the primary direction of emission and distanced from the first lens, and that the first lens and at least one additional lens each show non-spherically shaped coupling surfaces and decoupling surfaces as flat sides.

18 Claims, 2 Drawing Sheets

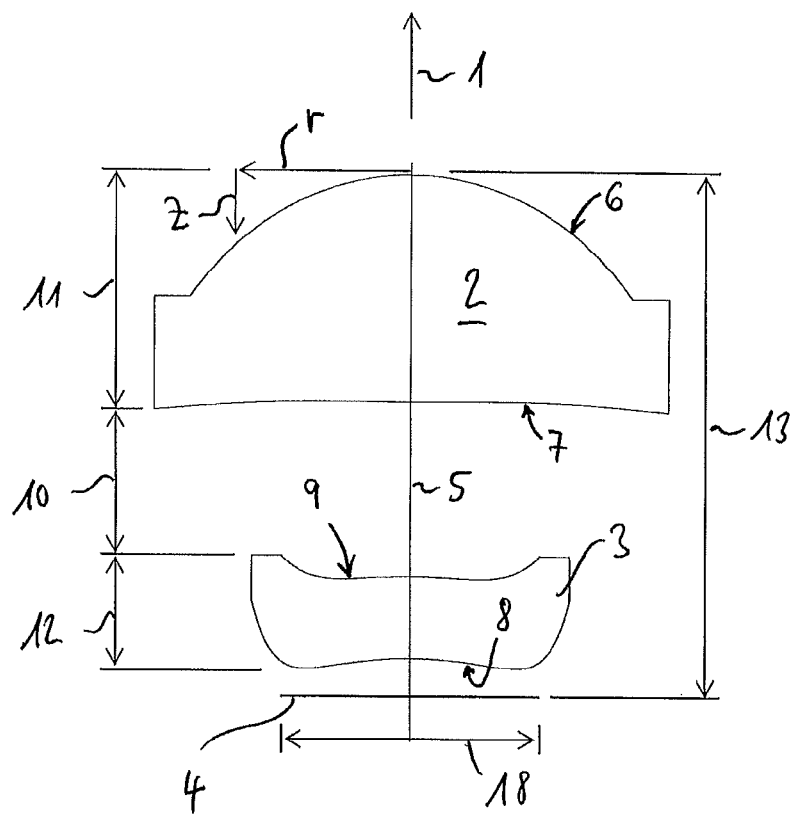
Figur 1
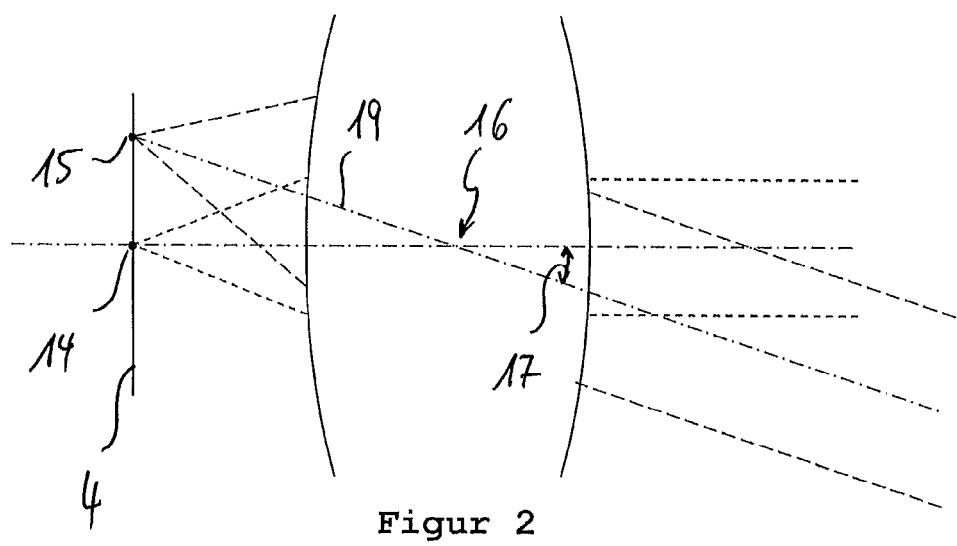
Figur 2

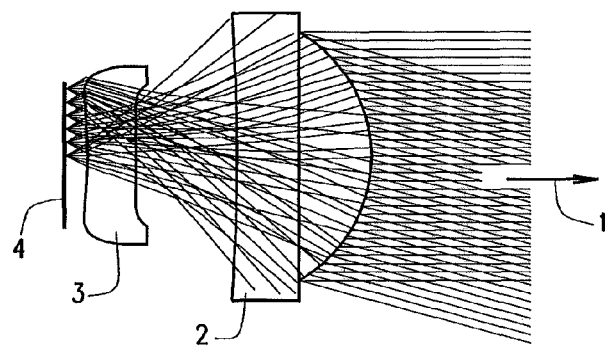
F I G . 3
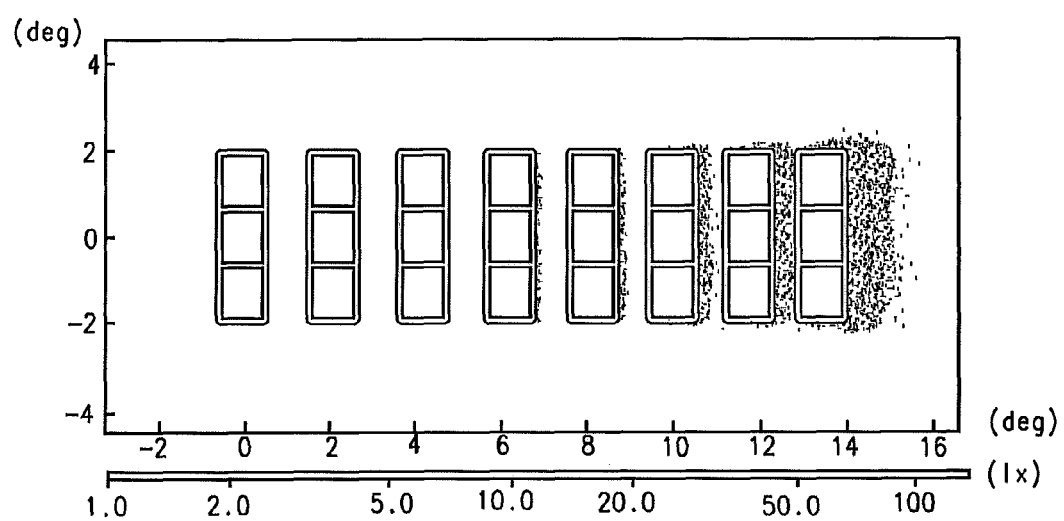
F I G . 4

TRANSFORMATION OPTICS ASSEMBLY

CROSS REFERENCE

This application claims priority to German Patent Application No. 10 2011 054 233.7, filed Oct. 6, 2011.

TECHNICAL FIELD OF THE INVENTION

The invention relates to a transformation optic arrangement for vehicles to convert a planar light distribution into an angular light distribution with a plurality of light sources arranged in one level like a matrix to generate a planar light distribution and with an optic unit arranged in front of the light sources in the primary direction of emission to deflect the light, with the optic unit comprising at least one first lens.

BACKGROUND OF THE INVENTION

In order to realize a dynamic light distribution, particularly a controllable high beam for vehicles via a matrix headlight preferably realized in LED technology, a targeted and precise impingement of the used and/or removed angular ranges is required. For example, the demand is known for a channel separation of 1°. For this purpose, a highly precise transformation optic is required, which converts the distribution of the light intensity in a reference level (planar light distribution) into an angular light distribution. This conversion must be of high quality for the entire light source matrix field so that particularly for light source matrix fields with large dimensions (for example 60 mm +/−20 mm) no solutions are known from prior art. This particularly applies if in addition to the above-mentioned high requirements for the channel separation restrictive conditions regarding structural length must be complied with.

SUMMARY OF THE INVENTION

The objective of the present invention is therefore to provide a transformation optic arrangement fulfilling the above-described requirements.

In order to attain the objective the invention is characterized in connection with the preamble of claim 1 such that at least one additional lens is provided between the first lens and the light sources, which is arranged coaxial in reference to the z-axis extending in the primary direction of emission of the light and distanced from the first lens, and that the first lens and at least one additional lens each show non-spherically shaped coupling areas and decoupling areas as flat sides.

The particular advantage of the invention comprises that using two lenses, each comprising non-spherically shaped coupling and decoupling areas, achieves the above-mentioned requirements with regard to channel separation (1°) for an array of light sources up to a size of 60 mm at a structural length of the transformation optic arrangement of up to 120 mm. This transformation optic arrangement here precisely converts the planar light distribution into an angular light distribution.

In particular, the first lens may comprise a front flat side (decoupling area) seen in the primary direction of emission and a rear flat side (coupling area) facing at least one other lens, with the geometry of the flat sides being determined by the non-spherical draw equivalent $$z = \frac{cr^2}{1 + \sqrt{1 - (1+K)c^2r^2}} + \sum_{k=1}^{5} \alpha_{2k} r^{2k}$$

to the formula. Here, z represents the z-coordinate on the respective flat side, r the lateral distance of the point on the flat side (coupling area, decoupling area) from the z-axis, c the apex curvature of the flat side, i.e. the inverse value of the radius of the lens curvature R, K the conical constant and $\alpha 2k$ the coefficients of the 2k-th order of a polynomial development. The parameters particularly assume the following values:

| R | K | $\alpha_{21}$ | $\alpha_{22}$ | $\alpha_{23}$ | $\alpha_{24}$ |
|---|---|---|---|---|---|
| 209.256 mm | 0 | −1.958E−3 | −6.843E−7 | 1.360E−10 | −8.581E−15 |

Permissible deviations (tolerances) for the decoupling areas are within the following ranges:

| R | K | $\Delta\alpha_{21}$ | $\Delta\alpha_{22}$ | $\Delta\alpha_{23}$ | $\Delta\alpha_{24}$ |
|---|---|---|---|---|---|
| 500 mm ... −100 mm | 0 | +/−1E−3 | +/−2E−7 | +/−4E−10 | +/−9E−15 |

With regard to the coupling area of the first lens the parameters preferably assume the following values:

| R | K | $\alpha_{21}$ | $\alpha_{22}$ | $\alpha_{23}$ | $\alpha_{24}$ |
|---|---|---|---|---|---|
| −76.860 mm | 0 | −2.882E−3 | −2.853E−7 | 1.628E−11 | −2.017E−14 |

Permissible deviations for the coupling area are discernible from the following table:

| R | K | $\Delta\alpha_{21}$ | $\Delta\alpha_{22}$ | $\Delta\alpha_{23}$ | $\Delta\alpha_{24}$ |
|---|---|---|---|---|---|
| −200 mm ... −50 mm | 0 | +/−1E−3 | +/−2E−7 | +/−4E−11 | +/−9E−14 |

In a similar manner, depending on the above-stated formula, the non-spheric draw is also determined for the coupling area and the decoupling area of a second and only additional lens. The parameters for the decoupling area preferably result from:

| R | K | $\alpha_{21}$ | $\alpha_{22}$ | $\alpha_{23}$ | $\alpha_{24}$ |
|---|---|---|---|---|---|
| infinite | 0 | −5.627E−3 | 7.439E−7 | −4.138E−10 | 6.202E−12 |

Permissible deviations for the decoupling area between the second lens are defined by the following table:

| R | K | $\Delta\alpha_{21}$ | $\Delta\alpha_{22}$ | $\Delta\alpha_{23}$ | $\Delta\alpha_{24}$ |
|---|---|---|---|---|---|
| infinite ... +500 mm | 0 | +/−1E−3 | +/−3E−7 | +/−5E−10 | +/−8E−12 |

The coupling area of the second lens is preferably defined by the following parameters:

| R | K | $\alpha_{21}$ | $\alpha_{22}$ | $\alpha_{23}$ | $\alpha_{24}$ |
|---|---|---|---|---|---|
| −184.093 mm | 0 | −1.392E−3 | 3.669E−6 | 1.211E−8 | −5.032E−12 |

Permissible deviations result as follows:

| R | K | $\Delta\alpha_{21}$ | $\Delta\alpha_{22}$ | $\Delta\alpha_{23}$ | $\Delta\alpha_{24}$ |
|---|---|---|---|---|---|
| −100 mm . . . −400 mm | 0 | +/−1E−3 | +/−3E−6 | +/−5E−8 | +/−8E−12 |

According to a further development of the invention at least 30 light sources are provided to generate the planar light distribution. The light sources are allocated in two, three, or four lines. Advantageously a plurality of different settings to reduce blinding can be achieved in the high-beam function by providing 30 light sources or more. Here, a high dynamic light function develops adjusted to the individual traffic situation. Due to the precise channel separation angular ranges with reduced blinding can be formed with sharp contours. For example, 80 or more light sources can be arranged like a matrix in three lines.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 1 A transformation optic arrangement in a side view,

FIG. 2 a beam path illustration for two selected light points of the planar light distribution to show the principle function of the transformation optic arrangement according to FIG. 1, FIG. 3 the transformation optic arrangement according to FIG. 1 with visualization of the beam path for selected light points, and FIG. 4 the illustration of the channel separation for selected light sources of a matrix arrangement of light sources using the transformation optic arrangement according to FIG. 1.

DETAILED DESCRIPTION

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

A transformation optic arrangement for vehicles according to FIG. 1 essentially comprises a first front lens 2 seen in the primary direction of light emission 1 and a second lens 3 arranged between the first lens 2 and the light sources, not shown. The light sources, not shown, provide a planar light distribution, which is schematically shown by the reference level 4. The first lens 2 and the second lens 3 as well as the level 4 are aligned coaxially in reference to a z-axis 5 of the transformation optic arrangement extending in the primary direction of emission 1.

The first lens 2 and the second lens 3 are preferably embodied rotary symmetrical in reference to the z-axis 5. The level 4 is realized by a light source matrix arrangement, for example, which shows 30 or more light sources in preferably three lines.

The first lens 2 comprises a front decoupling area 6 in the primary direction of emission 1 and a coupling area 7 facing the second lens 3. The decoupling area 6 and the coupling area 7 are embodied as flat sides of the first lens 2. The second lens 3 comprises a coupling area 8 facing one of the levels 4 and a decoupling area 9 facing a first lens 2. The coupling area 8 and the decoupling area 9 of the second lens 3 are also embodied as flat sides of the second lens 3.

The decoupling area 6 of the first lens 2 is embodied curved convexly. The coupling area 7 of the first lens 2 as well as the two flat sides 8, 9 of the second lens 3 are each embodied curved concavely.

The first lens 2 and the second lens 3 each show a distance 10 from 35 to 50 mm, preferably amounting to 43 mm. The first lens 2 shows a thickness 11 from 50 to 60 mm, preferably amounting to 56 mm, and is formed from N-BK10. The second lens 3 shows a thickness 12 from 15 to 25 mm, preferably amounting to 20 mm. It is also embodied from N-BK10. A structural length 13 of the transformation optic arrangement preferably amounts to 120 mm. The focal width of the transformation optic arrangement is preferably implemented for 105 mm. The lateral dimension 18 of the reference level 4 amounts to 60 mm, for example.

In order to visualize the function of the transformation optic arrangement the light path is shown for two selected points 14, 15 of the reference level 4 and in order to illustrate the principle the coupling area 8 of the second lens 3 and the decoupling area 6 of the first lens 2 are shown. The first point 14 of the level 4 is located on the z-axis 5 of the transformation optic arrangement. The partial light beam conically emitted from the first point 14 is linearized by the transformation optic arrangement and emitted parallel and coaxially in reference to the primary direction of emission 1.

Light emitted by the second point 15 is also emitted conically, with the cone being embodied symmetrical in reference to a straight 19 connecting the second point 15 and an optic center 16 of the transformation optic arrangement. The transformation optic arrangement renders parallel the light emitted by the second point 15 and sends it as a parallel partial light beam at an angle 17 in reference to the z-axis.

To this regard, the transformation optic arrangement provides for each arbitrary point 14, 15 of the level 4 an at least visually parallel partial light beam, which is provided at a corresponding angle.

FIG. 3 shows the light beam for a total of six points of the level 4 and the light distribution generated thereby.

The flat sides 6, 7 of the first lens 2 and the flat sides 8, 9 of the second lens 3 are embodied non-spherically. The geometry of the flat sides 6, 7, 8, 9 is determined by the non-spherical draw, according $$z = \frac{cr^2}{1 + \sqrt{1 - (1+K)c^2 r^2}} + \sum_{k=1}^{5} \alpha_{2k} r^{2k}$$

to the formula. Here, z represents the z-coordinate on the flat side 6, 7, 8, 9, r the lateral distance of a point on the flat side 6, 7, 8, 9, from the z-axis 5, c the apex curvature of the flat side 6, 7, 8, 9, i.e. the inverted value of the radius of the lens curvature R, K the conical constant and $\alpha_{2k}$ the coefficients of the 2k-th order of a polynomial development to illustrate the non-spherical draw. The non-spherical draw formed for the exemplary embodiment according to FIGS. 1 and 3 is defined by the preferred parameters in the value tables.

For selected light sources of a matrix vehicle headlight realized on an LED basis the light distribution provided is shown in FIG. 4. Here, a plurality of light sources is arranged evenly in a total of three lines. It shows that for the light sources illustrated a channel separation of 1° can be cleanly realized up to a range of approx. 12°.

FIG. 4 shows the light distribution only for selected light sources. The matrix arrangement is embodied, for example, symmetrical in reference to a horizontal and vertical 0°-axis. Between the light distributions shown, additional light distributions, not shown, are realized additionally by LED not illustrated in the simulation.

The preferred embodiments of the invention have been described above to explain the principles of the invention and its practical application to thereby enable others skilled in the art to utilize the invention in the best mode known to the inventors. However, as various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

LIST OF REFERENCE CHARACTERS

1 Primary direction of emission
2 First lens
3 Second lens
4 Reference level
5 z-axis
6 Decoupling area
7 Coupling area
8 Coupling area
9 Decoupling area
10 Distance
11 Thickness
12 Thickness
13 Band length
14 Point
15 Point
16 Optic center
17 Angle
18 Lateral dimension
19 Straight

The invention claimed is:

1. A transformation optic arrangement for vehicles to convert a planar light distribution into an angular light distribution with a plurality of light sources arranged in one level like a matrix to generate the planar light distribution and with an optic unit arranged in front of the light sources in a primary direction of emission to deflect the light, with the optic unit comprising at least one first lens, wherein at least one additional lens is provided between the first lens and the light sources, arranged co-axially in reference to the z-axis of the primary direction of emission of the light and distanced from the first lens and that the first lens and at least one additional lens each show non-spherically shaped coupling surfaces and decoupling surfaces as flat sides.

2. A The transformation optic arrangement according to claim 1, wherein one of said first and said additional lens comprises one concavely formed flat side; and wherein said other of said first and said additional lens comprises two concavely formed flat sides.

3. The transformation optic arrangement according to claim 1, wherein the first lens shows a flat side in the front seen in the primary direction of emission and at least one additional lens facing the rear flat side, with the geometry of the flat sides being determined by non-spheric draw, determined according to the formula $$z = \frac{cr^2}{1 + \sqrt{1 - (1+K)c^2 r^2}} + \sum_{k=1}^{5} \alpha_{2k} r^{2k}$$

with z representing the z-coordinate on the flat side, r the lateral distance of a point on the flat side from the z-axis, c the apex curvature of the flat side, i.e. the inverted value of the radius of the lens curvature R, K the conical constant and $\alpha_{2k}$ the coefficients of the 2k-th order of a polynomial development, and with
  the above-mentioned parameters assuming the following values for the coupling area:
  R=infinite up to +500 mm, preferably infinite
  K=0
  $\alpha 21 = -2{,}882E{-}3 +/- 1E{-}3$
  $\alpha 22 = -2{,}853E{-}7 +/- 2E{-}7$
  $\alpha 23 = 1{,}628E{-}11 +/- 4E{-}11$
  $\alpha 24 = -2{,}017E{-}14 +/- 9E{-}14$,
  the parameters assuming the following values for the decoupling areas:
  R=−100 mm to −400 mm, preferably −184 mm
  K=0
  $\alpha_{21} = -1{,}958E{-}3 +/- 1E{-}3$
  $\alpha_{22} = -6{,}843E{-}7 +/- 2E{-}7$
  $\alpha_{23} = 1{,}36E{-}10 +/- 4E{-}10$
  $\alpha_{24} = -8{,}581E{-}15 +/- 9E{-}15$.

4. The transformation optic arrangement according to claim 1, wherein said additional lens arranged between the first lens and the light sources comprises a rear flat side facing the light sources and a front flat side facing way from the light sources, with the geometry of the rear and front flat sides being determined by non-spheric draw determined according to the formula $$z = \frac{cr^2}{1 + \sqrt{1 - (1+K)c^2 r^2}} + \sum_{k=1}^{5} \alpha_{2k} r^{2k}$$

with z representing the z-coordinate on the respective flat side, r the lateral distance of the point on the flat side from the z-axis, c the apex curvature of the flat side, i.e. the inverse value of the radius of the lens curvature R, K the conical constant, and $\alpha_{2k}$ the coefficients of the 2k-th order of a polynomial development, and with the above-mentioned parameters assuming the following values for the coupling area:
  R=+500 mm to −100 mm, preferably +209 mm
  K=0

$\alpha21=-1,392E-3+/-1E-3$
$\alpha22=3,669E-6+/-3E-6$
$\alpha23=1,211E-8+/-5E-8$
$\alpha24=-5.032E-12+/-8E-12$,
the above-mentioned parameters assuming the following values for the decoupling areas:
R=−200 mm to −50 mm, preferably −77 mm
K=0
$\alpha21=5,627E-3+/-1E-3$
$\alpha22=7,439E-7+/-3E-7$
$\alpha23=4,138E-10+/-5E-10$
$\alpha24=6,202E-12+/-8E-12$.

5. The transformation optic arrangement according to claim 1, wherein a ratio between a longitudinal dimension of the transformation optic arrangement in the direction of the z-axis and a maximum lateral dimension of the planar light distribution ranges from 1 to 3.

6. The transformation optic arrangement according to claim 1, wherein a ratio between the longitudinal dimension of the transformation optic arrangement and a focal width of the optic unit ranges from 1.05 to 1.25.

7. The transformation optic arrangement according to claim 1, wherein the frontal flat side of the first lens in the primary direction of emission is embodied convexly curved.

8. The transformation optic arrangement according to claim 1, wherein at least 30 light sources are provided to generate the planar light distribution, with the light sources being arranged in two, three, or four lines.

9. The transformation optic arrangement according claim 1, wherein the first lens and/or the additional lens comprise optic flat sides embodied rotary symmetrical in reference to an optic axis and/or that a distance between the first lens and the second lens ranges from 35 to 50 mm, and/or that a thickness of the additional lens ranges from 15 to 25 mm, and/or the thickness of the large lens ranges from 50 to 60 mm.

10. The use of a transformation optic arrangement according to claim 1 in a lens matrix headlight for vehicles with light diodes as the light sources.

11. The transformation optic arrangement according to claim 1, wherein a ratio between a longitudinal dimension of the transformation optic arrangement in the direction of the z-axis and a maximum lateral dimension of the planar light distribution ranges from 1.5 to 2.5.

12. The transformation optic arrangement according to claim 1, wherein a ratio between a longitudinal dimension of the transformation optic arrangement in the direction of the z-axis and a maximum lateral dimension of the planar light distribution ranges from 1.8 to 2.2.

13. The transformation optic arrangement according to claim 1, wherein a ratio between the longitudinal dimension of the transformation optic arrangement and a focal width of the optic unit ranges from 1.1 to 1.2.

14. The transformation optic arrangement according to claim 1, wherein a ratio between the longitudinal dimension of the transformation optic arrangement and a focal width of the optic unit ranges from 1.14 to 1.15.

15. The transformation optic arrangement according to claim 1, wherein at least 30 light sources are provided to generate the planar light distribution, with the light sources being arranged in three lines.

16. The transformation optic arrangement according to claim 1, wherein at least 30 light sources are provided to generate the planar light distribution, with the light sources being arranged in three lines.

17. The transformation optic arrangement according to claim 1, wherein at least 30 light sources are provided to generate the planar light distribution, with the light sources being arranged in four lines.

18. The transformation optic arrangement according claim 1, wherein the first lens and/or the additional lens comprise optic flat sides embodied rotary symmetrical in reference to an optic axis and/or that a distance between the first lens and the second lens amounts to 43 mm and/or that a thickness of the additional lens amounts to 20 mm, and/or the thickness of the large lens amounts to 56 mm.

* * * * *